(12) United States Patent  
Nakamura

(10) Patent No.: US 8,472,332 B2
(45) Date of Patent: Jun. 25, 2013

(54) APPARATUS FOR DETECTING QUALITY DETERIORATION OF A TELECOMMUNICATIONS NETWORK BY DISCRIMINATING PERIODIC FAULTS

(75) Inventor: Nobuyuki Nakamura, Osaka (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 591 days.

(21) Appl. No.: 12/656,321

(22) Filed: Jan. 26, 2010

(65) Prior Publication Data

US 2010/0195520 A1 Aug. 5, 2010

(30) Foreign Application Priority Data

Feb. 4, 2009 (JP) .................. 2009-023351

(51) Int. Cl.
*H04L 12/26* (2006.01)
(52) U.S. Cl.
USPC .......................................... 370/252; 370/242
(58) Field of Classification Search
USPC .................. 370/241, 242, 244, 248, 250, 252
See application file for complete search history.

(56) References Cited

U.S. PATENT DOCUMENTS

| | | | | |
|---|---|---|---|---|
| 2007/0115832 | A1* | 5/2007 | Ramalho | 370/241 |
| 2007/0230346 | A1 | 10/2007 | Yamada et al. | |
| 2012/0203510 | A1* | 8/2012 | Perez et al. | 702/189 |
| 2012/0315942 | A1* | 12/2012 | Lin et al. | 455/509 |

FOREIGN PATENT DOCUMENTS

| | | |
|---|---|---|
| JP | 2001-160824 A | 6/2001 |
| JP | 2004-228746 A | 8/2004 |
| JP | 2006065619 A | 3/2006 |
| JP | 2008-042879 A | 2/2008 |

OTHER PUBLICATIONS

Ori Katsunori, "Spectrum Analysis of Packet Transmission Delay and Its Application to Network Management", *The Institute of Electronics, Information and Communication Engineers Technical Report*, The Institute of Electronics, Information and Communication Engineers, Nov. 6, 2008, vol. 108, No. 287, pp. 39-44.

* cited by examiner

*Primary Examiner* — Michael Thier
*Assistant Examiner* — Feben M Haile
(74) *Attorney, Agent, or Firm* — Rabin & Berdo, P.C.

(57) ABSTRACT

An apparatus for detecting deterioration in quality of a telecommunications network includes a packet monitor for monitoring a packet flowing through the network, a quality information extractor for extracting the quality index of the network on the basis of the packet monitored, a quality deterioration detector for detecting deterioration in quality of the network on the basis of the quality index. The quality deterioration detector determines, for the packet monitored and coming only from a wired line, that the quality of the network is deteriorated if the quality index decreases, and determines, for the packet monitored and coming from a wireless line, that the quality of the network is deteriorated if the quality index aperiodically decreases.

6 Claims, 13 Drawing Sheets

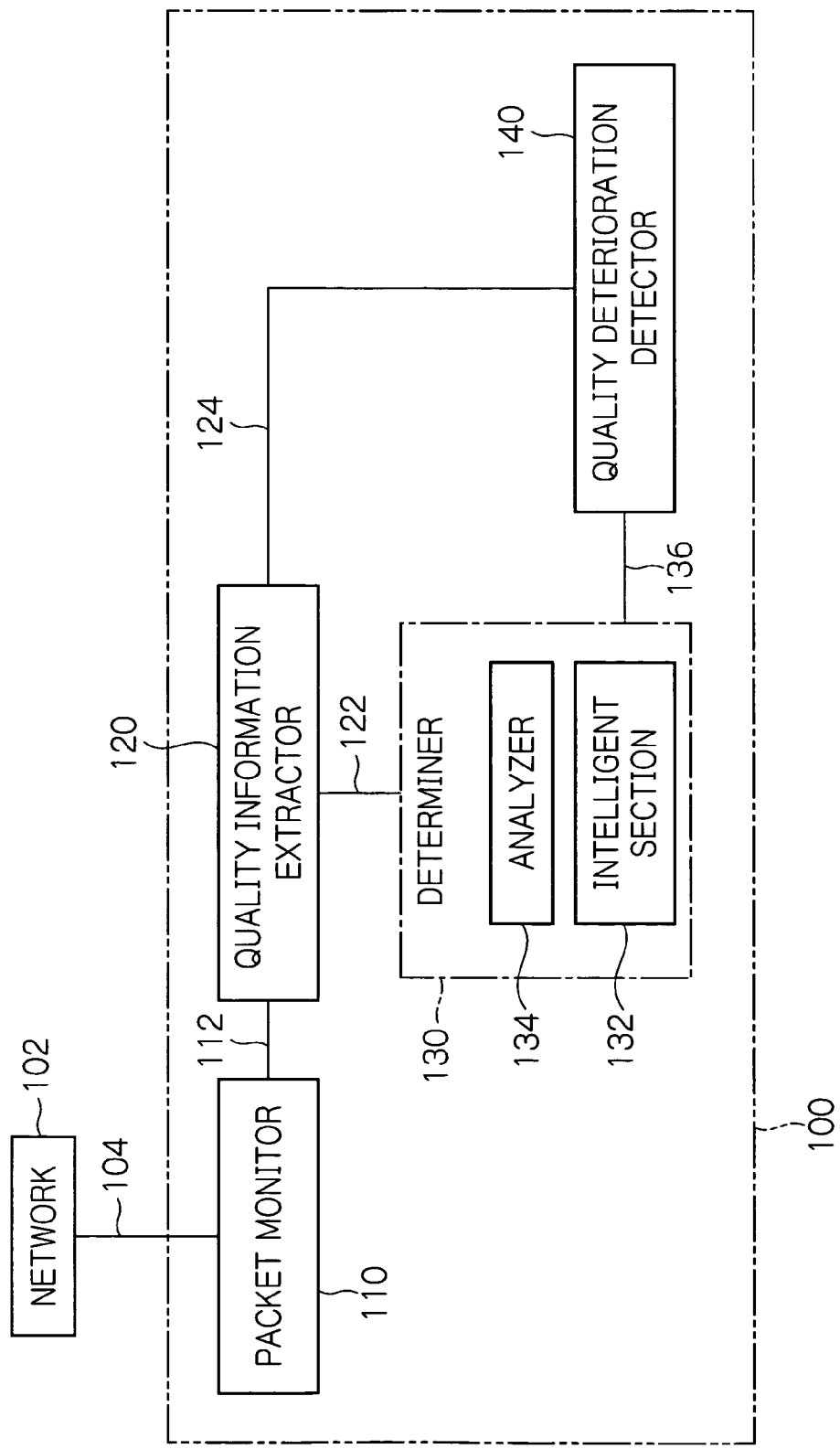

APPARATUS FOR DETECTING QUALITY DETERIORATION OF A TELECOMMUNICATIONS NETWORK BY DISCRIMINATING PERIODIC FAULTS

BACKGROUND OF THE INVENTION

1. Field of the Invention

The present invention relates to a telecommunications quality detector apparatus, and more specifically to a detector apparatus for detecting deterioration in quality of a telecommunications network. The present invention also relates to an apparatus for determining the property of a packet, and more specifically to an apparatus for determining the type of a line over which a packet is transmitted in a telecommunications network.

2. Description of the Background Art

As a conventional solution aiming at accurately determining whether a fault in telecommunications quality is caused by a server or a telecommunications network when the fault has occurred in a network application, Japanese patent laid-open publication No. 2006-65619 to Kamemoto discloses that packet data transmitted between an application server and its clients are always monitored by a network application fault locator, the processing times of the monitored packet data in the network and the server are evaluated on the basis of information defined beforehand, and the determined information is stored to be sent to a monitor or control station at a predetermined interval.

As another conventional solution aiming at providing a service quality manager that prevents deterioration of the quality of a communication service provided on a telecommunications network while effectively utilizing network resources, United States patent application publication No. US 2007/0230346 A1 to Yamada et al., discloses that a service quality management device for managing the quality of a communication service provided on a network to be managed comprises an information acquiring unit for acquiring service information containing information on sessions for the communication service and information on the network configuration, an information generation unit for generating information on the traffic volume of each of the sessions, a route determination unit for determining a packet route for each of the sessions based on those pieces of information, a calculation unit for calculating the traffic volume and the load of links based on the traffic volume and packet route for those sessions, and a quality judging unit for determining the quality of service attained by the sessions based on the calculated load of the links.

In a network including both wired and wireless lines, fluctuation in line or circuit quality of the wireless line can cause the frequent occurrence of quality deterioration such as a packet loss and a packet delay. This quality deterioration does not necessarily mean a fault network but can be considered as a periodical phenomenon constantly occurring. It is called "False Positive" to erroneously determine as a network fault such a phenomenon that should, in its nature, not be considered as a fault.

On this point, the object of the solution disclosed in Kamemoto is to detect a fault in a network application, and not a deterioration in quality which is involved in a gray area between normal and fault. In the case of this solution, when the network quality falls below a predetermined threshold level, it is erroneously recognized as "the occurrence of a fault".

The object of the solution disclosed in Yamada et al., is to monitor the quality of network service on the basis of the traffic volume and packet route for a communication session. The solution is therefore problematic in terms of real-time capability for monitoring. For example, the solution disclosed in Yamada et al., has difficulty in detecting a quality deterioration caused by, e.g. a temporary increase in packet loss, in real time. Therefore, this solution is not suitable for a service with the quality of network service warranted for a user.

Consequently, in a telecommunications network including both wired and wireless lines in which a temporary deterioration in quality may frequently occur, a solution has been desired which is capable of detecting such a quality deterioration.

SUMMARY OF THE INVENTION

It is therefore an object of the present invention to provide telecommunications quality detector apparatus for appropriately detecting deterioration in quality of a telecommunications network including wired and wireless lines in which a temporary deterioration in quality may frequently occur.

It is another object of the present invention to provide an apparatus for appropriately determining the type of a line over which a packet is transmitted in a telecommunications network including wired and wireless lines in which a temporary deterioration in quality may frequently occur.

In accordance with the present invention, a quality deterioration detector apparatus for detecting deterioration in quality of a telecommunications network includes a packet monitor for monitoring a packet flowing through the network, a quality information extractor for extracting the quality index of the network on the basis of the packet monitored, and a quality deterioration detector for detecting deterioration in quality of the network on the basis of the quality index. The quality deterioration detector determines, when the packet, monitored comes from a wireless line, that the quality of the network is deteriorated if the quality index aperiodically decreases.

In an aspect of the present invention, the quality deterioration detector further determines, when the packet monitored comes only from a wired line, that the quality of the network is deteriorated if the quality index substantially decreases.

In accordance with the present invention, a determining apparatus for determining the type of a line over which a packet flowing through a telecommunications network has passed includes a packet monitor for monitoring the packet, a quality information extractor for extracting the quality index of the network on the basis of the packet monitored, and a determiner which includes an analyzer for analyzing the spectrum of a temporal change in the quality index and determines whether the packet monitored comes only from a wired line or comes from a wireless line on the basis of the result of the spectral analysis of the temporal change in the quality index.

The quality deterioration detector apparatus of the present invention may thus change a criterion for determining the quality deterioration, depending on whether a packet has passed through only a wired line or through a wireless line. Therefore, quality deterioration for a packet having passed through only a wired line can be surely detected while the possibility of an erroneous detection for a packet having passed through a wireless line can be reduced.

BRIEF DESCRIPTION OF THE DRAWINGS

The objects and features of the present invention will become more apparent from consideration of the following detailed description taken in conjunction with the accompanying drawings in which:

FIG. 1 is a functional block diagram schematically showing a quality deterioration detector apparatus in accordance with an embodiment of the present invention;

DESCRIPTION OF THE PREFERRED EMBODIMENTS

Figure 2A:
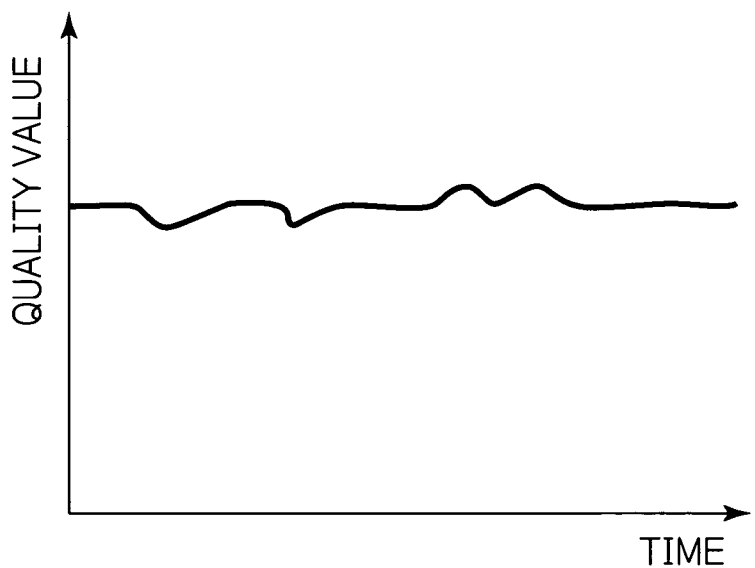
FIGS. 2A and 2B are graphs showing a temporal change in the quality index and its frequency spectrum, respectively, of a telecommunications network only including wired lines when working normally.
Figure 2B:
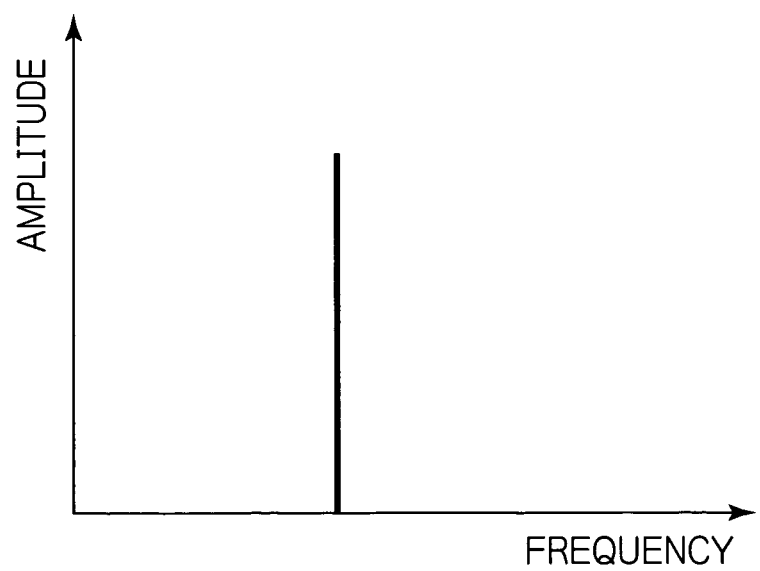

Preferred embodiments in accordance with the present invention will be described below with reference to the accompanying drawings, wherein those embodiments are by no means limited by what are specifically shown in the drawings. Note also that any specific conditions applied in the description below are none other than mere preferred exemplifications, and never limit the embodiments.

FIG. 1 is a functional block diagram schematically showing a quality deterioration detector apparatus 100 in accordance with an embodiment of the present invention. The quality deterioration detector apparatus 100 is connected to a telecommunications network 102 by a transmission line, or circuit, 104. The network 102 may be configured only by wired lines, and may include both wired and wireless lines. Of course, as the line 104, either of the wired and wireless lines can be used.

The quality deterioration detector apparatus 100 serves as detecting substantial deterioration in quality that is specifically in an intermediate, or gray, area where the network 102 stays between its normal and faulty conditions. In the context, the word "quality" is to specifically be understood in connection with telecommunications, such as transmission, connection and service.

The line, or connection, 104 extending from the network 102 is connected to a packet monitor 110 which has its output 112 connected to a packet information extractor 120. The packet monitor 110 is adapted to monitor a packet flowing through the network 102 to output the monitored packet to the packet information extractor 120.

The packet monitor 110 in the embodiment may be implemented in a network interface, for example. So far as a packet flowing through the network 102 can be monitored essentially on a real time basis, the packet monitoring function may be implemented by any means other than such a network interface as directly connected to the network 102.

The packet monitor 110 need not be structured to monitor all packets flowing through the network 102 but may be structured to monitor only packets that are needed to detect quality deterioration of the network 102.

The quality information extractor 120 is adapted to manage the packet monitored and transferred thereto by the monitor 110 on a proper unit basis such as a session-by session basis, and acquires, or extracts, information on the quality of the network 102 from the packet.

The quality information extractor 120 has its outputs 122 and 124 connected to a determiner 130 and a quality deterioration detector 140, respectively, and outputs the quality information thus acquired to the units 130 and 140.

Information on the quality, i.e. quality information, of the network 102 may be acquired by monitoring a packet regulated according to telecommunications protocols such as RTCP (Real-time Transport Control Protocol: RFC1889) and RTCP-XR (Real-time Transport Control Protocol Extended Reports: RFC3611). Other proper procedures may also be applied.

The quality information can include quality indices, or indicators, such as the number of packets lost, i.e. packet losses, the rate of packets lost, the delay of packets, i.e. packet latency, jitter, an estimated quality value, e.g. MOS (Mean Opinion Score), and various index values for measuring or representing QoS/QoE (Quality of Service/Quality of Experience). For the number of packets lost, the rate of packets lost, the delay of a packet and jitter, their accumulated values in a predetermined period of time or a session may be used.

The determiner 130 is adapted to use a fluctuation pattern or the like of the quality index on the network 102 represented by quality information acquired from the quality information extractor 120 to determine whether the monitored packet has come only from wired lines or a wireless line, or connection. A determination procedure in the determination unit 130 will be described below with reference to FIGS. 2A through 4B. The determiner 130 may include an analyzer 134 adapted for analyzing the spectrum of a temporal change in the quality index.

The determiner 130 has its output 136 connected to a quality deterioration detector 140 and outputs the results of the determination described above and of the spectral analysis described below with reference to FIGS. 2A to 4B to the detector 140. Those results are also provided to an intelligent section 132 included in the determiner 130.

The intelligent section 132 is adapted to learn a temporal change in the quality index of the network 102 by means of the procedure described below with reference to FIGS. 2A to 4B. In this sense, the intelligent section 132 may be referred to as a learning device.

The quality deterioration detector 140 serves as using the quality information acquired by the quality information extractor 120 and the above-described results of determination and spectral analysis acquired from the determiner 130 to detect quality deterioration of the network 102. A detection procedure will be described below with reference to FIGS. 2A to 4B.

The quality information extractor 120, the determiner 130, the quality deterioration detector 140, the intelligent section 132 and the analyzer 134 can be implemented by hardware such as electronics circuits designed for attaining their functions and by a processor system such as a microcomputer or a CPU (Central Processing Unit) and software defining its operation. Additionally, a necessary storage device such as a memory may be appropriately arranged as required for implementing these functions.

Next, a description will be made on operation of the quality deterioration detector apparatus 100 thus configured as described above. FIGS. 2A through 3B are graphs plotting temporal changes in the quality index and its frequency spectra of the network 102 in its normal condition. Specifically, FIG. 2A illustrates a temporal change in the quality index when only wired lines are used, and FIG. 3A illustrates the quality index when a wireless line is used.

When the network 102 through which a packet has passed is configured only by wired lines, the quality index in the normal condition, i.e. no fault occurs in the network 102 is stable as shown in FIG. 2A. When this stable waveform is analyzed in spectrum by the analyzer 134, the frequency spectrum is simple as exemplified in FIG. 2B. In this example, a large spectrum appears only at a specific frequency.

Figure 3A:
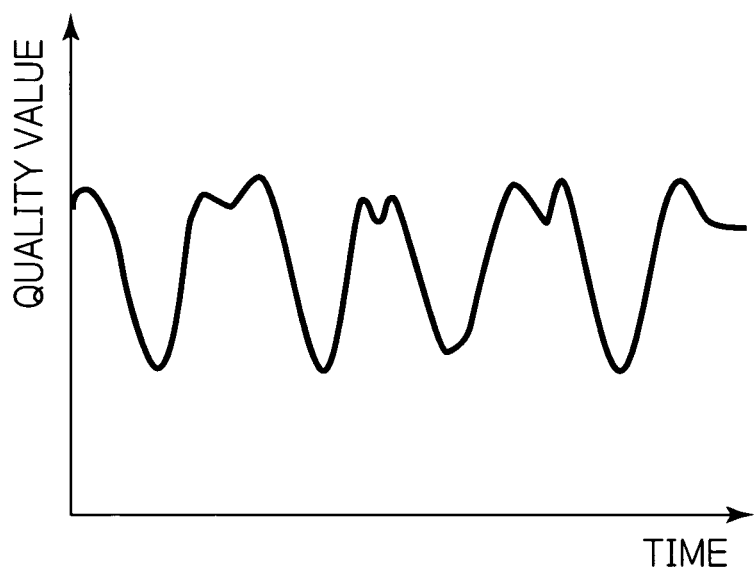
FIGS. 3A and 3B are graphs showing a temporal change in the quality index and its frequency spectrum, respectively, of a telecommunications network only including a wireless line when working normally.
Figure 3B:
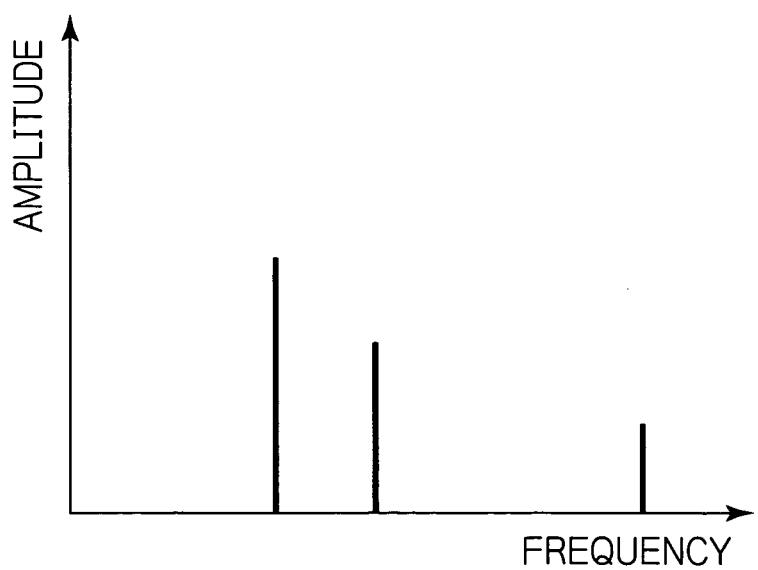

When the network 102 through which a packet has passed is configured only by wireless lines or at least partially includes a wireless line, the quality index in the normal condition remarkably varies, or fluctuates, as shown in FIG. 3A. An example of frequency spectrum on this waveform analyzed by the analyzer 134 is shown in FIG. 3B. This example is directed to the case where large spectrums appear at plural frequencies.

The determiner 130 acquires information on a temporal change in the quality index in the normal operation of the network 102 from the quality information extractor 120, and analyzes the frequency spectrum of the temporal change as described above to allow the intelligent section 132 to learn analyzed results. For the learning, it is not always necessary to use actual packets, but data obtained from a simulation or the like may be used to thereby have the intelligent section 132 virtually learn.

Meanwhile, when the network 102 through which a packet has passed is at least partially configured by a wireless line, a learning procedure is what will be described below by way of example. The degree of mixture, or co-existence, of wired and wireless lines can also be learned through a similar procedure.

For instance, the waveform of a temporal change in quality index itself in the case of wired and wireless lines co-existing is learned for each mixture pattern.

In another instance, respective waveforms of the temporal change in quality index in the cases of the network configured only by wired lines and only by wireless lines are multiplied by proper coefficients and added together, thereby simulating the waveform of the temporal change in the case of the wired and the wireless lines co-existing.

In yet another instance, the respective results of learning when the network is configured only by the wired lines and when it is configured only by the wireless lines are multiplied by proper coefficients and thereafter added to each other, thereby simulating the results of learning in the case of the wired and the wireless lines mixed.

It has been described above how to learn a temporal change in the quality index in a normal condition. Now, it will be described how to learn a temporal change in an abnormal condition while exemplifying a waveform and a spectrum in the abnormal condition.

Figure 4A:
FIGS. 4A and 4B are graphs showing a temporal change in the quality index and its frequency spectrum, respectively, of a network through which a packet has passed is configured only by wired lines when anomaly occurs periodically in the network.
Figure 4B:
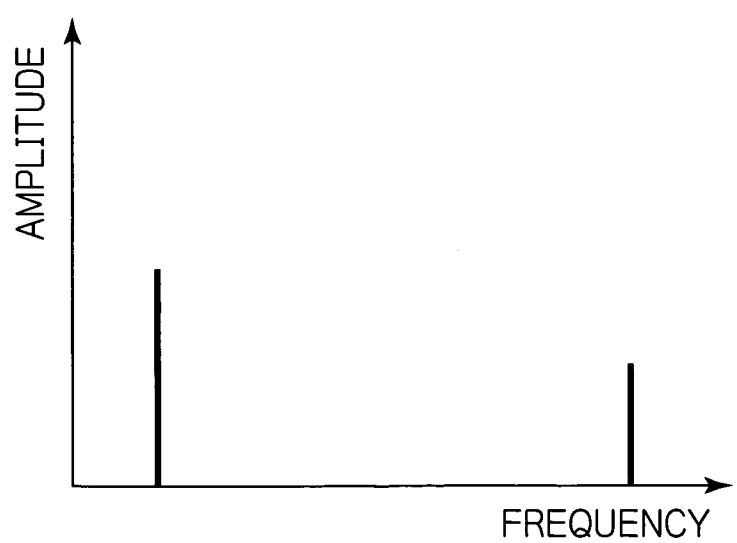
Figure 5A:
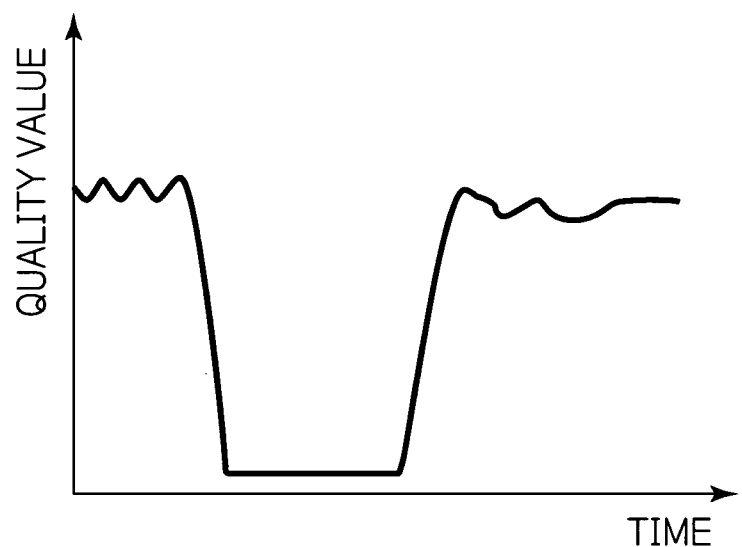
FIGS. 5A and 5B are graphs showing a temporal change in the quality index and its frequency spectrum, respectively, of a network through which a packet has passed is configured only by wired lines when anomaly occurs temporarily in the network.
Figure 5B:
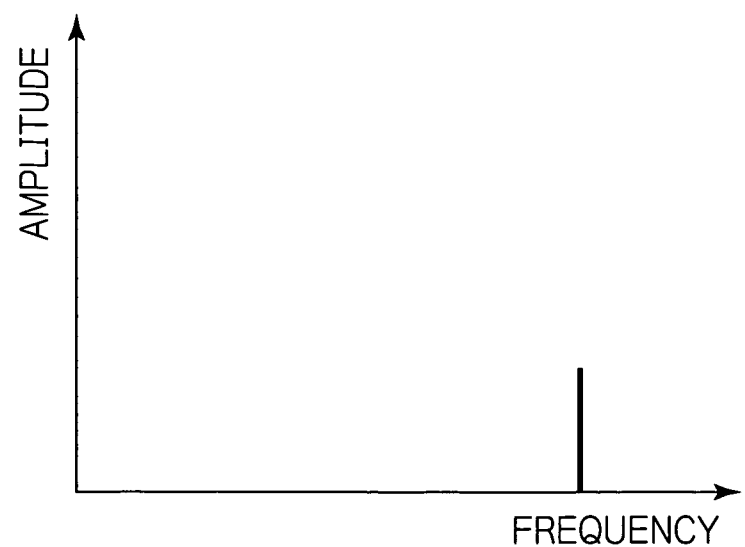

FIGS. 4A and 5A are graphs showing, when the network 102 through which a packet has passed is configured only by wired lines, temporal changes in the quality index of the network in the case of the occurrence of anomaly. FIG. 4A is a graph when a fault occurs periodically, and FIG. 5A is a graph when a fault occurs temporarily. FIGS. 4B and 5B are graphs showing results from spectrum analyses made on the temporal changes plotted in FIGS. 4A and 5A, respectively.

In the case of the occurrence of periodical faults shown in FIG. 4A, a spectrum having a large amplitude appears in a frequency band different from that in the normal condition, as shown in FIG. 4B. This can be used for detecting the occurrence of a periodical fault.

The network 102, when configured only by wired lines, intrinsically has its quality index stable as shown in FIG. 2A. Therefore, periodical quality deterioration as shown in FIG. 4A occurring may be caused by, for example, a fault such as malfunction of some device involved.

In the case of the occurrence of a temporary fault shown in FIG. 5A, a spectrum having a large amplitude also appears in a frequency band different from that in the normal condition, as shown in FIG. 5B. This can be utilized for detecting the occurrence of a temporary fault. The case of temporary quality deterioration occurring as shown in FIG. 5A can be obviously considered as a serious quality deterioration encountered.

Figure 6A:
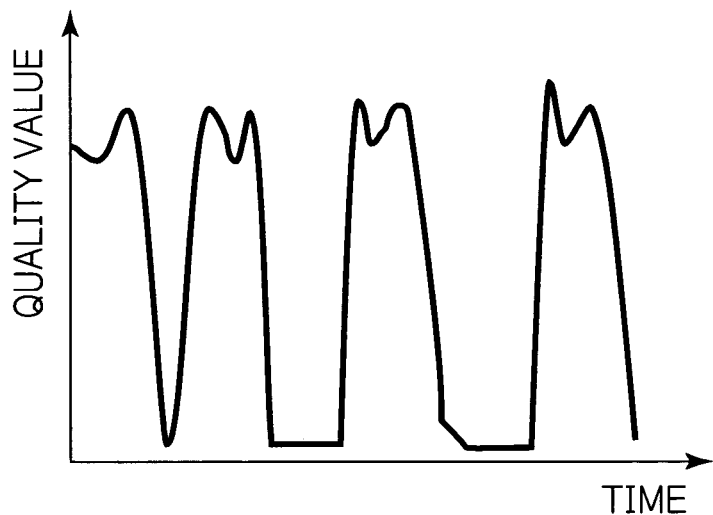
FIGS. 6A and 6B are graphs showing a temporal change in the quality index and its frequency spectrum, respectively, of a network through which a packet has passed is configured by a wireless line when anomaly occurs periodically in the network.
Figure 6B:
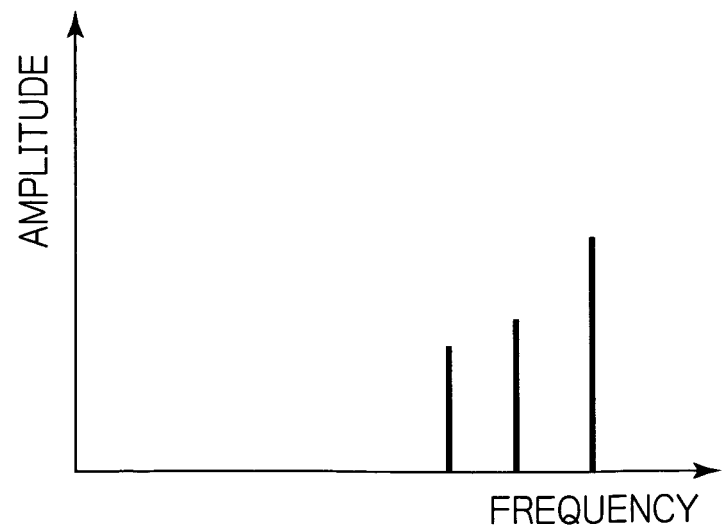
Figure 7A:
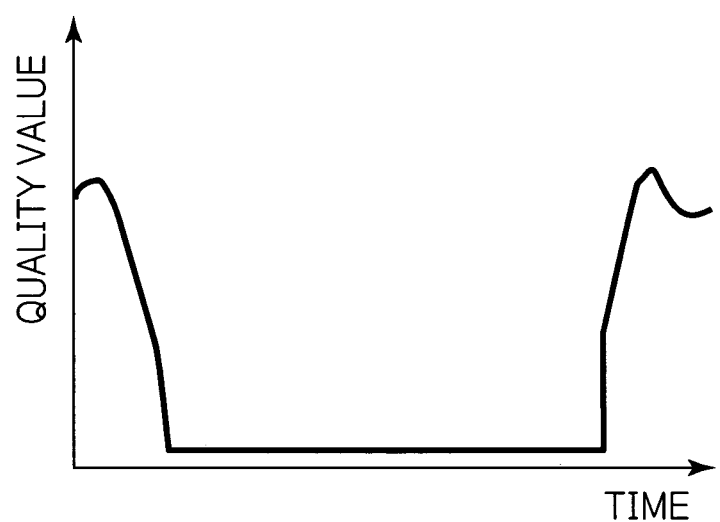
FIGS. 7A and 7B are graphs showing a temporal change in the quality index and its frequency spectrum, respectively, of a network through which a packet has passed is configured by a wireless line when anomaly occurs temporarily in the network.
Figure 7B:
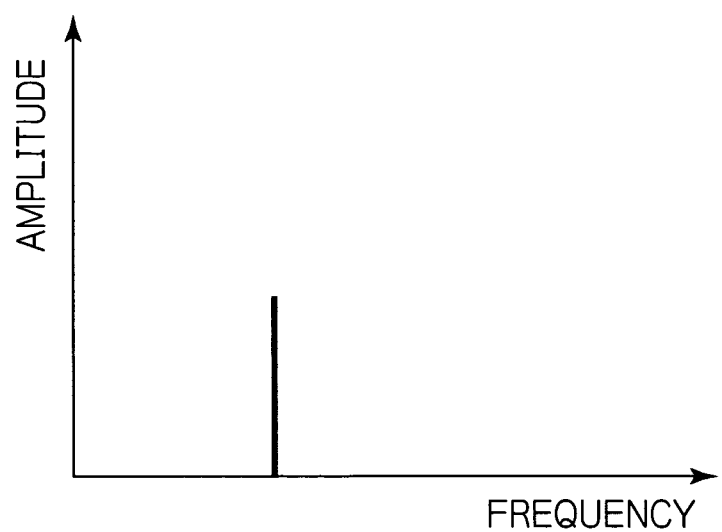

FIGS. 6A and 7A are graphs showing, when the network 102 through which a packet has passed is configured only by wireless lines or at least partially includes a wireless line, temporal changes in the quality index of the network 102 in the case of the occurrence of anomaly. FIG. 6A is a graph when a fault occurs periodically, and FIG. 7A is a graph when a fault occurs temporarily. FIGS. 6B and 7B are graphs showing results from spectrum analyses made on the temporal change shown in FIGS. 6A and 7A, respectively.

In the case of the occurrence of a periodical fault shown in FIG. 6A, a spectrum having its amplitude large appears in a frequency band different from that in the normal condition, as shown in FIG. 6B. This can be used for detecting the occurrence of a periodical fault.

In the network 102 including at least partially a wireless line, fluctuation in line quality of the wireless line may sometimes cause periodical quality deterioration to occur. This can be attributed to, for example, radio wave interference periodically incurred from the surrounding environment of the wireless line.

Since such periodical deterioration in performance of the wireless line will not cause the communication to be totally shut down, the user is unlikely to notice the deterioration. Additionally, the wireless lines are in nature subjected to such periodical deterioration in performance. It would therefore result in an erroneous detection, i.e. so-called False Positive, to determine a fault every time such deterioration occurs.

When a temporary fault shown in FIG. 7A occurs, a spectrum having a large amplitude appears in a frequency band different from that in the normal condition, as shown in FIG. 7B. On the basis of this spectrum, the occurrence of a temporary fault can be detected.

The occurrence of the fault as shown in FIG. 7B can be attributed to, for example, radio wave interference continuing for a long period of time from the surrounding environment or the like of the wireless line. Since the occurrence of temporary quality deterioration as shown in FIG. 7A accompanies communication shut down, the user can readily notice the fault unlike the case of a periodical fault. In this case, it can be said that a fault is to be determined to occur.

Well, the determiner 130 acquires a temporal change in the quality index in an abnormal condition as described with reference to FIGS. 4A-7B from the quality information extractor 120 and analyzes the frequency spectrum of the temporal change to allow the intelligent section 132 to learn analyzed results. Similarly to the normal condition described above, it is not always necessary to be use actual packets, but data obtained from a simulation or the like may be used to thereby have the intelligent section 132 virtually learn.

Meanwhile, when the network 102 through which a packet has passed is at least partially configured by a wireless line, a learning procedure and the learning of the degree of mixture of wired and wireless lines may be similar to the procedures in the normal condition.

For each of the cases of wired and wireless lines, it has been described above that the intelligent section 132 is controlled to learn beforehand temporal changes in the quality indices in normal and abnormal conditions. Next, operations for detecting quality deterioration will be described with reference to the control steps S110-S180 shown in FIG. 9.

At first, in step S110, the intelligent section 132 beforehand learns as described above.

In step S120, the packet monitor 110 monitors packets on a suitable unit basis such as a session-by-session basis from the connected network 102, and outputs the packet to the quality information extractor 120.

Next in step S130, the quality information extractor 120 acquires, or extracts, quality information of the packet monitored by the packet monitor 110, and outputs the quality information to the determiner 130 and the quality deterioration detector 140.

In step S140, the analyzer 134 in the determiner 130 analyzes the spectrum of a quality value carried on the quality information acquired from the quality information extractor 120, and delivers a result of the analysis to the intelligent section 132.

In step S150, the artificial intelligence 132 compares the result of the spectral analysis provided by the determiner 130 with the result of the learning performed beforehand as described above. The intelligent section 132 determines from the comparison whether the packet monitored comes only from wired lines or from a wireless line, and provides a result from the determination to the determiner 130. Additionally, the intelligent section 132 determines whether or not a fault occurs in the network 102.

In turn, the determiner 130 outputs the determination result representative of whether the packet monitored comes only from a wired line or from a wireless line and whether or not a fault occurs in the network 102 to the quality deterioration detector 140 (step S160).

Figure 10:
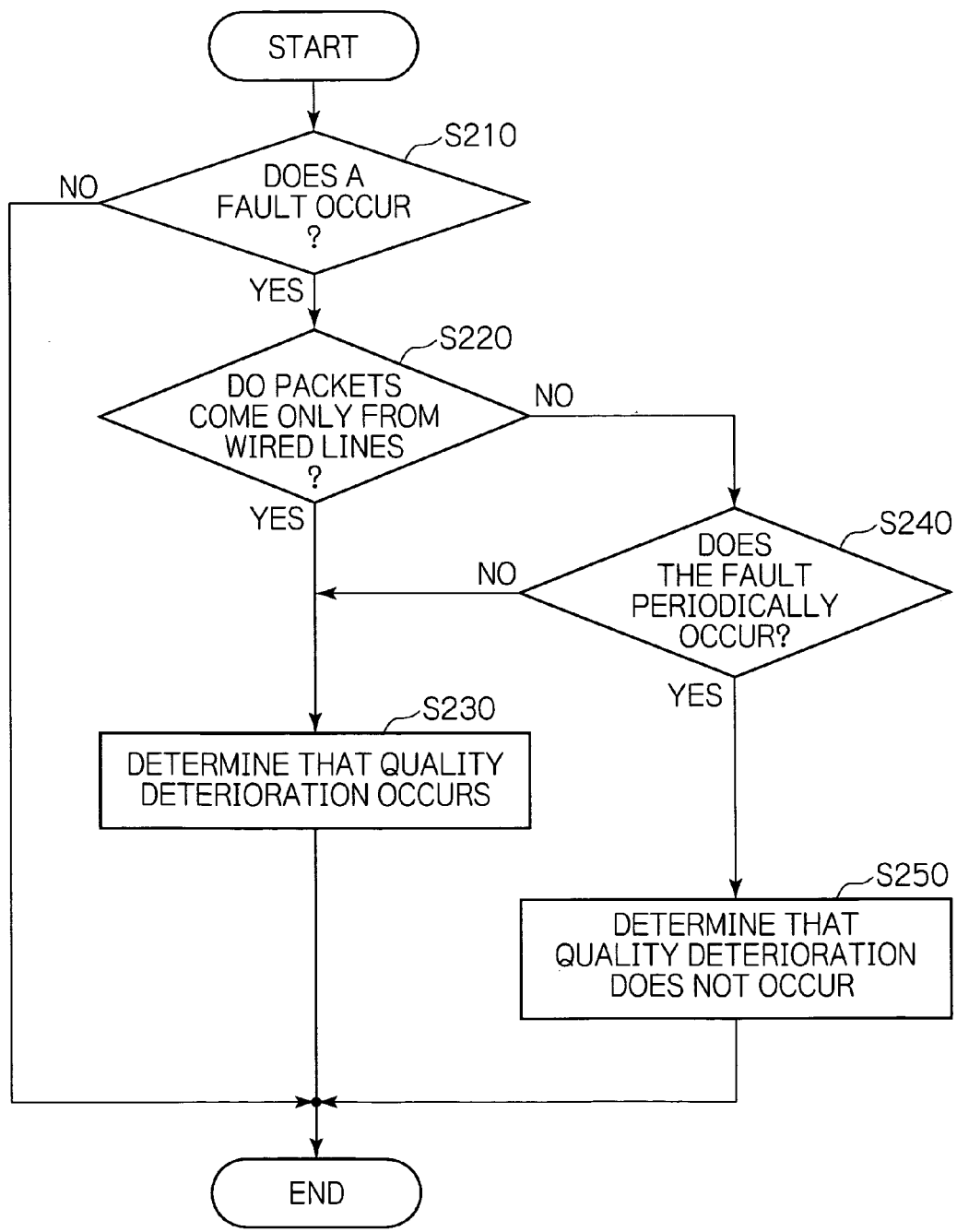
FIG. 10 is a flowchart showing detailed steps of the detection step shown in FIG. 9.

When the quality deterioration detector 140 receives from the intelligent section 132 the determination result representing that a fault occurs in the network 102, the detector 140 detects quality deterioration of the network 102 (step S170) in the procedure which will be described below. A more specific procedure of the detection in step 170 will be shown as a sub-flowchart in FIG. 10. The procedure is performed in the quality deterioration detector 140.

When receiving the determination result representing that a fault occurs in the network 102 from the intelligent section 132 (YES in step S210), the detector 140 proceeds to steps S220, et seq. When receiving the determination result representing that a fault does not occur from the intelligent section 132, the process finishes.

In the case where a packet monitored comes only from wired lines (YES in step S220), the quality deterioration detector 140 determines that a fault occurs in the network and that its quality is deteriorated (step S230). If necessary, the determination result may be outputted to the exterior of the quality deterioration detector apparatus 100. Furthermore, if necessary, the determination of anomaly may be performed after acquiring a current value of quality information from the quality information extractor 120 to confirm that the quality index is actually or substantially decreased.

In the case where a packet monitored comes at least partially from a wireless line (NO in step S220), the quality deterioration detector 140 determines, when receiving the determination result representing that a periodical fault as depicted in FIG. 6A occurs from the intelligent section 132 (YES in step S240), that no quality deterioration is caused by a fault in the network 102 (step S250).

Otherwise, i.e. when the quality deterioration detector 140 receives the determination result representing that a temporary or aperiodic fault as shown in FIG. 7B occurs from the intelligent section 132 (YES in step S220), the detector 140 determines that quality deterioration caused by the network 102 fault occurs (step S230).

Additionally, if necessary, the determination result may be outputted to the exterior of the quality deterioration detector apparatus 100. Furthermore, if necessary, the determination of anomaly may be performed after acquiring a current value of quality information from the quality information extractor 120 to confirm an actual decrease in the quality index.

Figure 9:
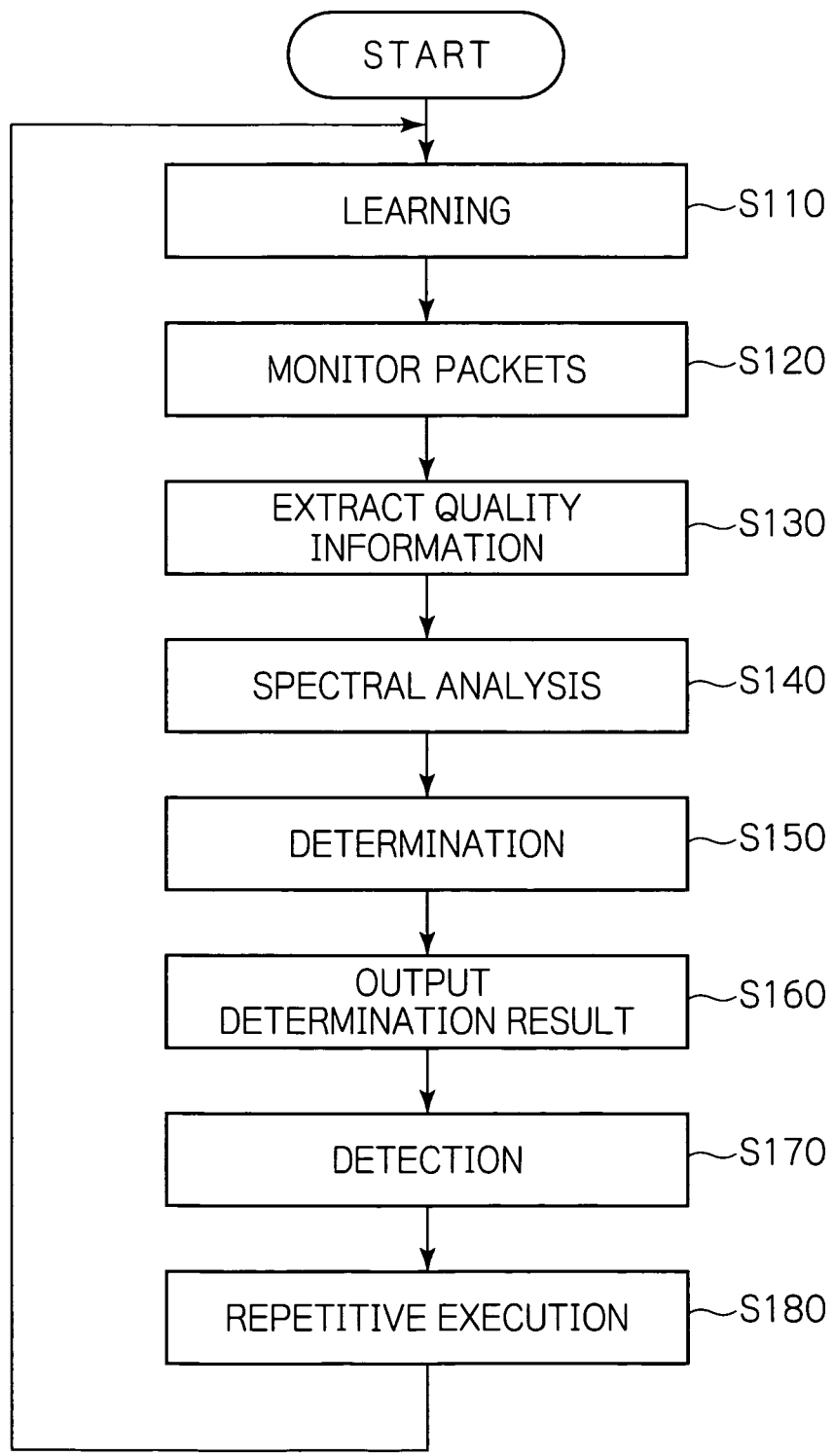
FIG. 9 is a flowchart useful for understanding an operation of the quality deterioration detector apparatus shown in FIG. 1.

The appropriate constituent elements in the quality deterioration detector apparatus 100 will repeat the operations in the steps S110-S170, as conceptually depicted as step S180 in FIG. 9. Thus, the operation proceeds by the quality deterioration detecting apparatus 100 as described above.

In the above illustrative embodiment, the intelligent section 132 determines whether or not a fault is periodical, i.e. whether a fault is periodic or aperiodic. However, the intelligent section 132 may be adapted to determine only whether or not a fault occurs. In this case, the quality deterioration detector 140 may be adapted to determine whether or not a fault is periodical.

More specifically in this case, the operation of the determination by the unit 140 may proceed as described below. First, the past result of a spectral analysis of the determiner 130 is stored in an appropriate memory device, not shown. Then, the quality deterioration detector 140 checks out the past result of a spectral analysis against a current spectrum to determine whether or not the current spectrum matches a periodical spectrum involved in the occurrence of a fault.

In summary, the quality deterioration detector apparatus 100 in accordance with the embodiment determines whether the monitored packet has passed only on wired lines or at least partially on a wireless line, and then detects quality deterioration of the network 102.

Therefore, quality deterioration of the wired line can be surely detected. Additionally, for the network 102 at least partially including a wireless line, the possibility of erroneous determination can be reduced that quality deterioration envisioned, such as a periodical decrease in the quality index caused by fluctuation in quality of the wireless line, is erroneously recognized as a false positive.

The illustrative embodiment of the quality deterioration detector apparatus 100 is depicted and described as configured by separate functional blocks, such as the quality information extractor 120. It is however to be noted that such a depiction and a description do not restrict the detector apparatus 100 to an implementation only in the form of hardware but the detector apparatus 100 may partially or entirely be implemented by software, namely, by a computer, or processor system, which has a computer program installed and functions, when executing the computer program, as part of, or the entirety of, the detector apparatus 120. That may also be the case with illustrative embodiments which will be described below. In this connection, the word such as "unit" or "section" may be understood not only as hardware, such as an electronic circuit but also as a function that may be implemented by software installed and executed on a computer.

Figure 11:
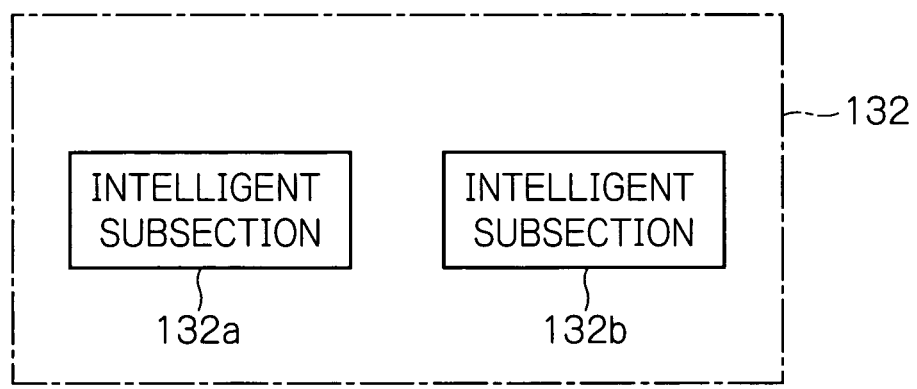
FIG. 11 shows an exemplified configuration of the intelligent section shown in FIG. 1.

In the embodiment described above, the single intelligent section 132 determines both line types and the occurrence of a fault. However, those functions may not necessarily be integrated into such a single intelligent section. That is to say, in an alternative embodiment, those determinations may be performed by separate intelligent sections. For example, as shown in FIG. 11, the intelligent section 132 may be implemented as plural intelligent subsections 132a and 132b. In this case, the intelligent subsections 132a and 132b may be adapted to determine line types and the occurrence of a fault, respectively.

As another alternative embodiment of the invention, an exemplary configuration of the intelligent section 132 will be described which is implemented by means of the architecture of a neurocomputer. The functional structure of the quality deterioration detector apparatus 100 in accordance with this alternative embodiment may be similar to that of the embodiment previously described.

Figure 8:
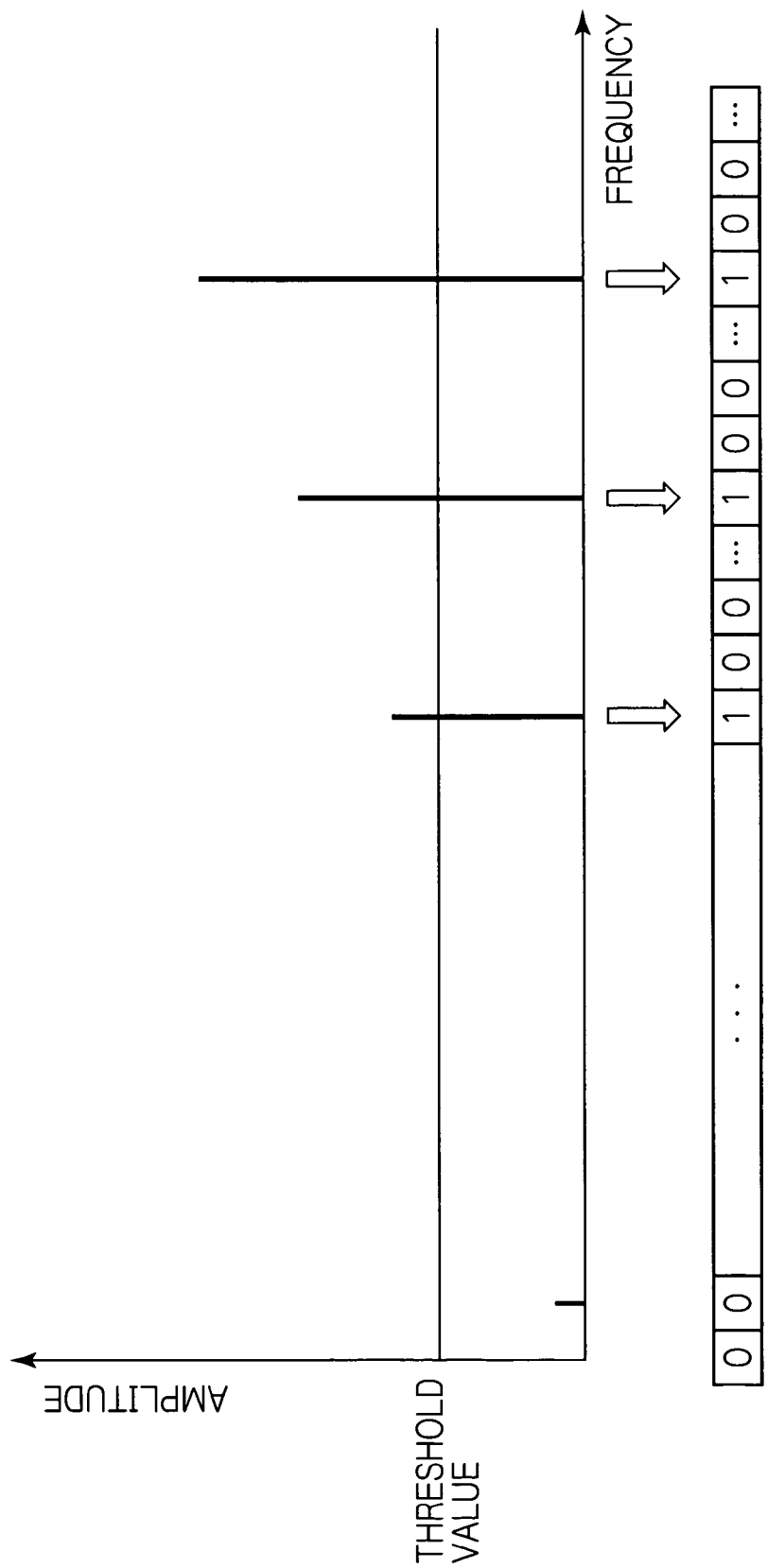
FIG. 8 exemplarily shows how to encode the result from a spectrum analysis by the determiner in the embodiment shown in FIG. 1.

With reference to FIG. 8, it will be described how the result of a spectrum analyzed by the determiner 130 is encoded by way of example. In the present alternative embodiment, the analyzer 134 in the determiner 130 analyzes the spectrum of the quality value carried on the quality information acquired from the quality information extractor 120, and encodes the analyzed result to a binary value "0" or "1", accordingly.

More specifically, a threshold value is beforehand defined for the amplitude of a spectrum, and then a value "1" is assigned to a frequency band in which the amplitude exceeds the threshold value, and a value "0" to a frequency band in which the amplitude does not exceed the threshold value.

Thus, the determiner 130 encodes the result of the spectral analysis of the quality value carried on the quality information to a sequence of bits. The intelligent section 132 receives the sequence of bits obtained by the encoding from the determiner 130.

Figure 12:
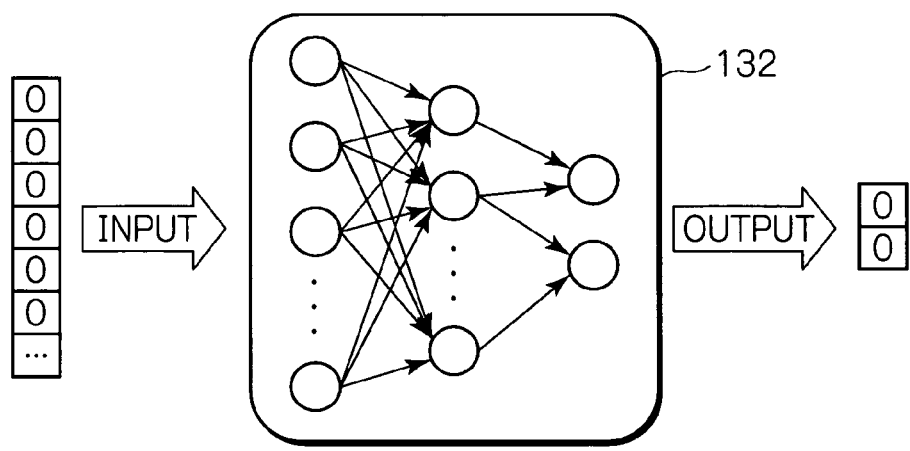
FIGS. 12 and 13 exemplarily show how the intelligent section works.

FIG. 12 shows an exemplified configuration of the intelligent section 132. In this embodiment, the intelligent section 132 is implemented by a neurocomputer.

The intelligent section 132 receives, as learning data, bit sequences obtained by encoding the results of spectral analyses in a normal and a fault situation for each of wired and wireless lines to a bit value of "0" or "1". The intelligent section 132 uses the learning data to learn the results of spectral analyses in the normal and fault situations for each of wired and wireless lines.

In this case, the intelligent section 132 may be adapted not only to merely determine whether or not a fault occurs, but also whether the fault is periodical or temporary to learn the respective results.

The result of the learning by the intelligent section 132 is stored therein in a form such as weighting coefficients of the neurons.

The intelligent section 132 is configured to form the determination result into a suitable data format such as a bit sequence to output the determination result in that format. For example, one bit represents the line type, wired/wireless, and another bit represents the quality condition, normal/anomaly, i.e. a couple of bits in total are outputted. Furthermore, adding one bit representing whether or not anomaly is periodical, the three bits in total may be outputted. Other proper output formats may also be applied. The intelligent section 132 is thus exemplarily configured.

Next, the operation of the quality deterioration detector apparatus 100 in the present alternative embodiment will be described. Steps S110-S130, FIG. 9, may be similar to those described in connection with the previous embodiment.

In step S140, however, the analyzer 134 included in the determiner 130 analyzes the spectrum of the quality information acquired from the quality information extractor 120, and encodes the analyzed result to a bit sequence as shown in FIG. 8 to provide the encoded result to the intelligent section 132.

The intelligent section 132 compares the bit sequence provided from the determiner 130 with the result of learning performed beforehand as described above (step S150).

The intelligent section 132 determines whether the packet monitored comes only from wired lines or from a wireless line on the basis of the comparison result, and delivers the determination result to the determiner 130. Additionally, the intelligent section 132 determines whether or not a fault occurs in the network. Following steps S160-S180 may be similar to those described in connection with the previous embodiment.

A further alternative embodiment of the present invention will be described in which the intelligent section 132 is exemplarily configured by means of the architecture of a support vector machine. The quality deterioration detector apparatus 100 of the instant alternative embodiment may be similar in configuration and operation to the illustrative embodiments described above except for the configuration of the intelligent section 132.

Figure 13:
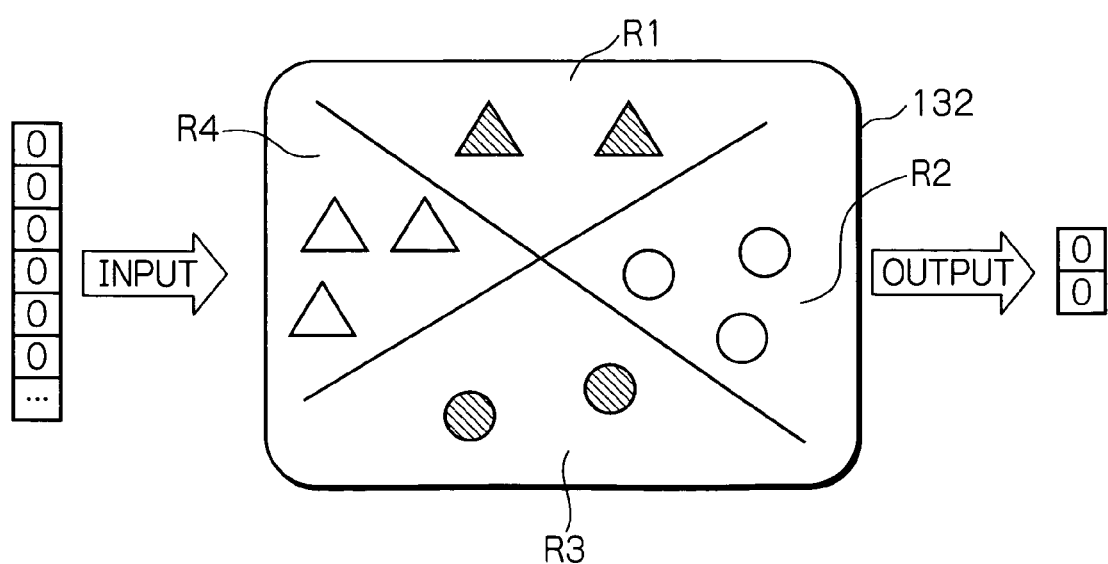

FIG. 13 shows such an exemplified configuration of the intelligent section 132. In this alternative embodiment, the intelligent section 132 is implemented by a support vector machine.

Specifically, the intelligent section 132 receives, as learning data, bit sequences obtained by encoding the results of spectral analyses in a normal and a fault situation for each of wired and wireless lines to a bit value "0" or "1", as shown in FIG. 8. The intelligent section 132 uses the learning data to learn the results of spectral analyses in the normal and fault situations for each of wired and wireless lines.

The result of the learning by the intelligent section 132 is stored therein in a form such as a boundary line or a boundary plane representing distinctions between line types of wired/wireless and normal/anomaly.

For example, the intelligent section 132 partitions, as the learning progresses, the space represented by the bit sequences obtained by encoding the result of a spectral analysis into four regions that are wired/normal (R1), wired/anomaly (R2), wireless/normal (R3), and wireless/anomaly (R4).

The intelligent section 132 receives data obtained by encoding the result of a spectral analysis from the analyzer 134 included in the determiner 130, and then determines to which of the four regions partitioned by the above-described boundary line or plane the encoded data belong. Thus, the intelligent section 132 can distinguish the line types of wired/wireless and the normal/anomaly respectively from each other.

The intelligent section 132 may be adapted to learn encoded bit sequences such that, in addition to determination on whether or not a fault occurs, distinction on whether the fault is periodical or temporary will be learnt.

The intelligent section 132, in the instant alternative embodiment also, may be configured to form a result from the determination into a proper format such as a bit sequence to output the determination result in that format. For example, one bit represents the line type, wired/wireless, and another bit represents the quality condition, normal/anomaly, i.e. the two bits in total are outputted. Furthermore, adding one bit representing whether or not anomaly is periodical, the three bits in total may be outputted.

The illustrative embodiments described above are directed to detecting quality deterioration of the network 102. The embodiments are structured such as to determine whether a packet monitored comes only from wired lines or from a wireless line. A further alternative embodiment of the present invention is exemplarily configured as a determining apparatus which includes only the function of determining the line types of wired/wireless.

Figure 14:
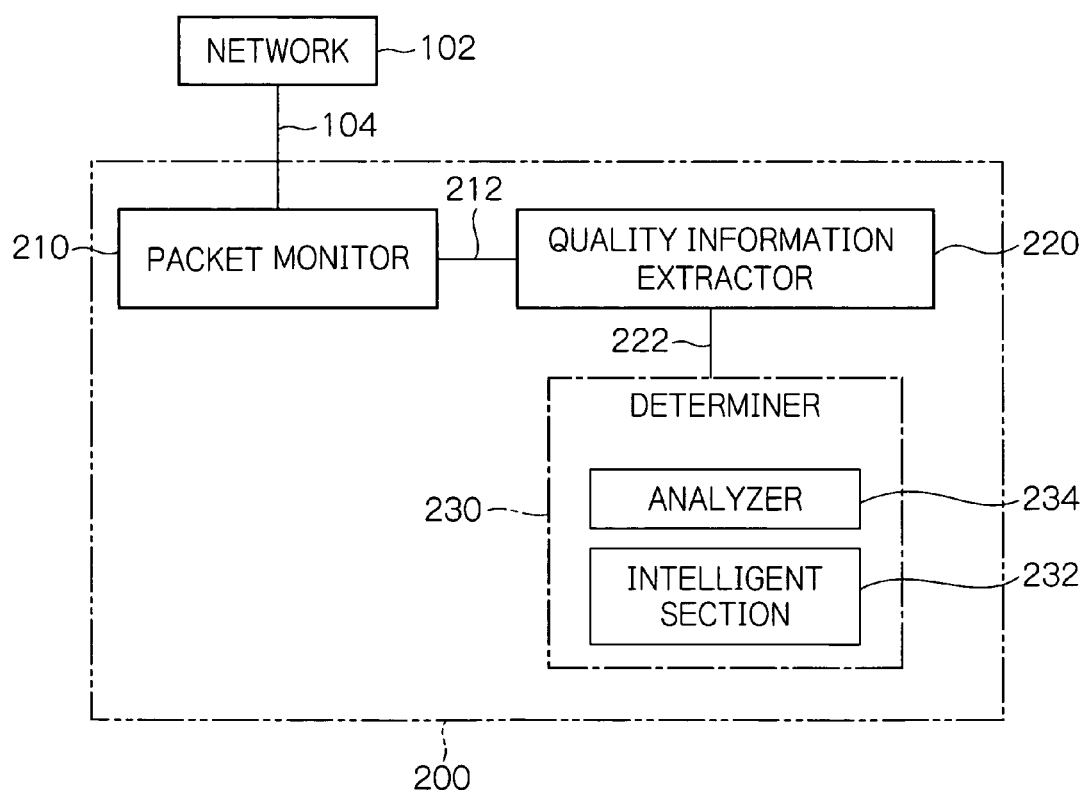
FIG. 14 is a functional block diagram, like FIG. 1, schematically showing a determining apparatus in accordance with an alternative embodiment of the present invention.

FIG. 14 is a schematic functional block diagram of a determining apparatus 200 in accordance with this alternative embodiment. The determining apparatus 200 includes a packet monitor 210 connected to the network 102 by the line 104 and having its output 112 interconnected to a quality information extractor 220. The quality information extractor 220 has its output 222 interconnected to a determiner 230. The determiner 230 can include an intelligent section 232 and an analyzer 234 for analyzing the spectrum of a temporal change in the quality index.

The functions of the units 210, 220 and 230 may be similar to those of the units 110, 120 and 130, respectively, of the illustrative embodiments described above.

However, the intelligent section 232 may simply have the function of determining the line types of wired/wireless, and need not have the function of determining whether or not a fault occurs in the network 102. Therefore, the intelligent section 231 can be more simplified in its internal configuration and output than the previous embodiments. For example, the output therefrom may include a singe bit.

Thus, the determining apparatus 200 in accordance with this alternative embodiment may be operative in the manner described above as to the previous embodiments determining whether a packet monitored comes only from wired lines or from a wireless line.

The entire disclosure of Japanese patent application No. 2009-023351 filed on Feb. 4, 2009, including the specification, claims, accompanying drawings and abstract of the disclosure, is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A quality deterioration detector apparatus for detecting deterioration in quality of a telecommunications network, comprising:
   a packet monitor for monitoring a packet flowing through the network;
   a quality information extractor for extracting a quality index of the network on a basis of the packet monitored;
   a determiner including an analyzer for analyzing a spectrum of a temporal change in the quality index;
   a first intelligent section having learned first results of spectral analyses performed beforehand on a packet monitored and coming only from a wired line and on a packet monitored and coming from a wireless line, said first intelligent section comparing results of an analysis of the spectrum of the temporal change currently performed with the first results, and determining whether the packet monitored comes only from the wired line or comes from the wireless line on the basis of a comparison result of said first intelligent section; and
   a quality deterioration detector for detecting deterioration in the quality of the network on the basis of the quality index, said quality deterioration detector determining, when the packet monitored comes from the wireless line, that the quality of the network is deteriorated if the quality index aperiodically decreases, and when the packet monitored comes only from the wired line, that the quality of the network is deteriorated if the quality index substantially decreases.

2. The apparatus in accordance with claim 1, further comprising a second intelligent section having learned second results of the spectral analyses performed beforehand on the packet monitored and coming only from the wired line and on the packet monitored and coming from the wireless line,
   said second intelligent section comparing the results of the spectral analysis currently performed with the second results, and
   said quality deterioration detector detecting the deterioration in the quality of the network on the basis of a comparison result of said second intelligent section.

3. The apparatus in accordance with claim 2, wherein said first intelligent section and said second intelligent section are integrated into a single section.

4. The apparatus in accordance with claim 2, wherein
   said second intelligent section beforehand has learned a third result of the spectral analysis performed beforehand on the periodical temporal change in the quality index in a normal condition of the network for the packet monitored and coming from the wireless line,
   said second intelligent section comparing the result of the spectral analysis currently performed on the temporal change in the quality index with the third result,
   said quality deterioration detector detecting the deterioration in the quality of the network on the basis of a comparison result of said second intelligent section.

5. The apparatus in accordance with claim 4, wherein said quality deterioration detector determines, when the quality index substantially decreases, whether the quality index decreases periodically or aperiodically on the basis of the comparison result.

6. A determining apparatus for determining a type of a line over which a packet flowing through a telecommunications network has passed, comprising:
   a packet monitor for monitoring the packet;
   a quality information extractor for extracting a quality index of the network on a basis of the packet monitored;
   a determiner including an analyzer for analyzing a spectrum of a temporal change in the quality index; and
   an intelligent section having learned results of spectral analyses performed beforehand on a packet monitored and coming only from a wired line and on a packet monitored and coming from a wireless line, said intelligent section comparing a result of a spectral analysis currently performed with the learned results,
   wherein said determiner determines whether the packet monitored comes only from the wired line or comes from the wireless line on the basis of a comparison result of said intelligent section.

* * * * *